United States Patent
Gu et al.

(10) Patent No.: US 10,209,923 B2
(45) Date of Patent: Feb. 19, 2019

(54) COALESCING CONFIGURATION ENGINE, COALESCING CONFIGURATION TOOL AND FILE SYSTEM FOR STORAGE SYSTEM

(71) Applicant: EMC Corporation, Hopkinton, MA (US)

(72) Inventors: Cory Zhongyan Gu, Beijing (CN); Colin Yong Zou, Beijing (CN); Ried Ruifang Liu, Beijing (CN)

(73) Assignee: EMC Ip Holding Company LLC, Hopkinton, MA (US)

( * ) Notice: Subject to any disclaimer, the term of this patent is extended or adjusted under 35 U.S.C. 154(b) by 193 days.

(21) Appl. No.: 15/096,622

(22) Filed: Apr. 12, 2016

(65) Prior Publication Data
US 2017/0024325 A1   Jan. 26, 2017

(30) Foreign Application Priority Data
Apr. 16, 2015  (CN) .................. 2015 1 01815733

(51) Int. Cl.
| G06F 12/00 | (2006.01) |
| G06F 13/00 | (2006.01) |
| G06F 13/28 | (2006.01) |
| G06F 3/06 | (2006.01) |

(52) U.S. Cl.
CPC ............ *G06F 3/0659* (2013.01); *G06F 3/061* (2013.01); *G06F 3/067* (2013.01); *G06F 3/0665* (2013.01); *G06F 3/0605* (2013.01); *G06F 3/0611* (2013.01); *G06F 3/0641* (2013.01)

(58) Field of Classification Search
CPC ...... G06F 3/0659; G06F 3/067; G06F 3/0605; G06F 3/0665; G06F 3/0641; G06F 3/061; G06F 3/0611
USPC .................. 711/157, 154, 163, 168, 202
See application file for complete search history.

(56) References Cited

U.S. PATENT DOCUMENTS

| 8,458,700 B1* | 6/2013 | Arrance ............. G06F 9/45558 718/1 |
| 2012/0117226 A1* | 5/2012 | Tanaka ................ H04L 41/0266 709/224 |
| 2013/0332614 A1* | 12/2013 | Brunk ................ H04L 67/1097 709/226 |

* cited by examiner

*Primary Examiner* — Mark Giardino, Jr.
*Assistant Examiner* — Shane Woolwine
(74) *Attorney, Agent, or Firm* — Krishnendu Gupta; Konrad R. Lee

(57) ABSTRACT

Embodiments of the present disclosure provide a method, a coalescing configuration engine, a coalescing configuration tool and a file system for a storage system, and comprises at least one initiator, each initiator accessing a corresponding storage space in the storage system via at least one virtual logic unit number LUN by executing in parallel a plurality of configuration operations, wherein each configuration operation is used to configure a mapping relationship between the at least one virtual LUN and the at least one initiator.

7 Claims, 17 Drawing Sheets

Figure 1:
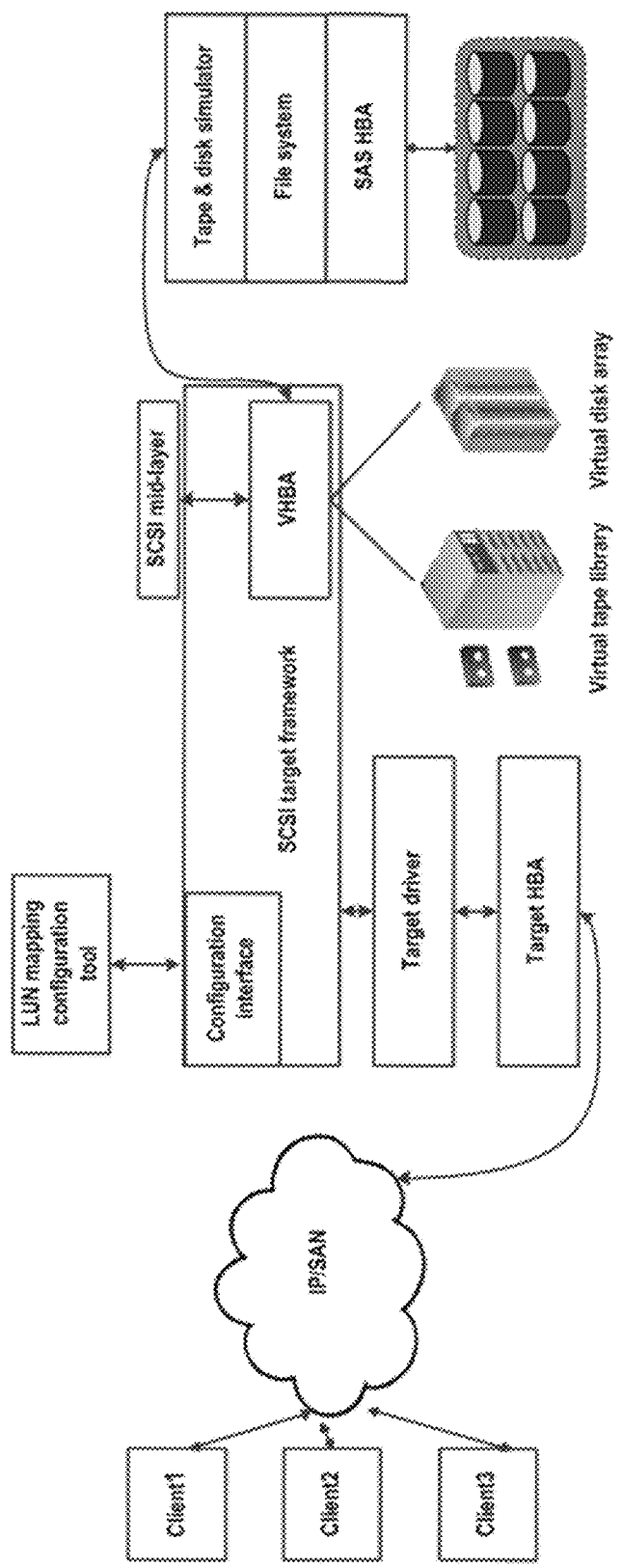

COALESCING CONFIGURATION ENGINE, COALESCING CONFIGURATION TOOL AND FILE SYSTEM FOR STORAGE SYSTEM

RELATED APPLICATION

This application claim priority from Chinese Patent Application Number CN2015101815733, filed on Apr. 16, 2015 at the State Intellectual Property Office, China, titled "METHOD, COALESCING CONFIGURATION ENGINE, COALESCING CONFIGURATION TOOL AND FILE SYSTEM FOR STORAGE SYSTEM," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD OF THE INVENTION

Embodiments of the present disclosure relate to a storage system.

BACKGROUND OF THE INVENTION

Generally, most storage systems may be configured to provide data and services to a client system via a standard small computer system interface (SCSI) protocol. Typically, in a SCSI protocol, an SCSI initiator is an end point that may initiate a SCSI session, i.e., transmitting a SCSI command. Usually, an initiator may not provide any logical unit numbers (LUNs). Alternatively, a SCSI target may be an end point that may not initiate a session, but may wait for a command from an initiator and may provide a required input/output data transfer. Generally, a target may provide one or more LUNs to an initiator; otherwise, it may be impossible to issue a read or write command. Usually, a read or write command may then redirected to an internal storage file system for further processing.

Nowadays, large number of mobile devices and users create a relatively huge amount of data. Typically, the may require storage systems to support a large amount of virtual LUNs with large capacity. A deduplication storage system may provide higher capacity to a user due to its high compression ratio. Likewise, there may be requirements where deduplication storage systems may export a large amount of virtual LUNs for various storage customers.

SUMMARY OF THE INVENTION

Example embodiments of the present disclosure provide a coalescing configuration engine, coalescing configuration etool, a file system and a method for a storage system. In one embodiment the storage system may include at least one initiator, each initiator accessing a corresponding storage space in the storage system via at least one virtual logic unit number LUN, and executing in parallel a plurality of configuration operations, wherein each configuration operation is used to configure a mapping relationship between the at least one virtual LUN and the at least one initiator.

BRIEF DESCRIPTION OF THE PREFERRED EMBODIMENTS

Figure 2:
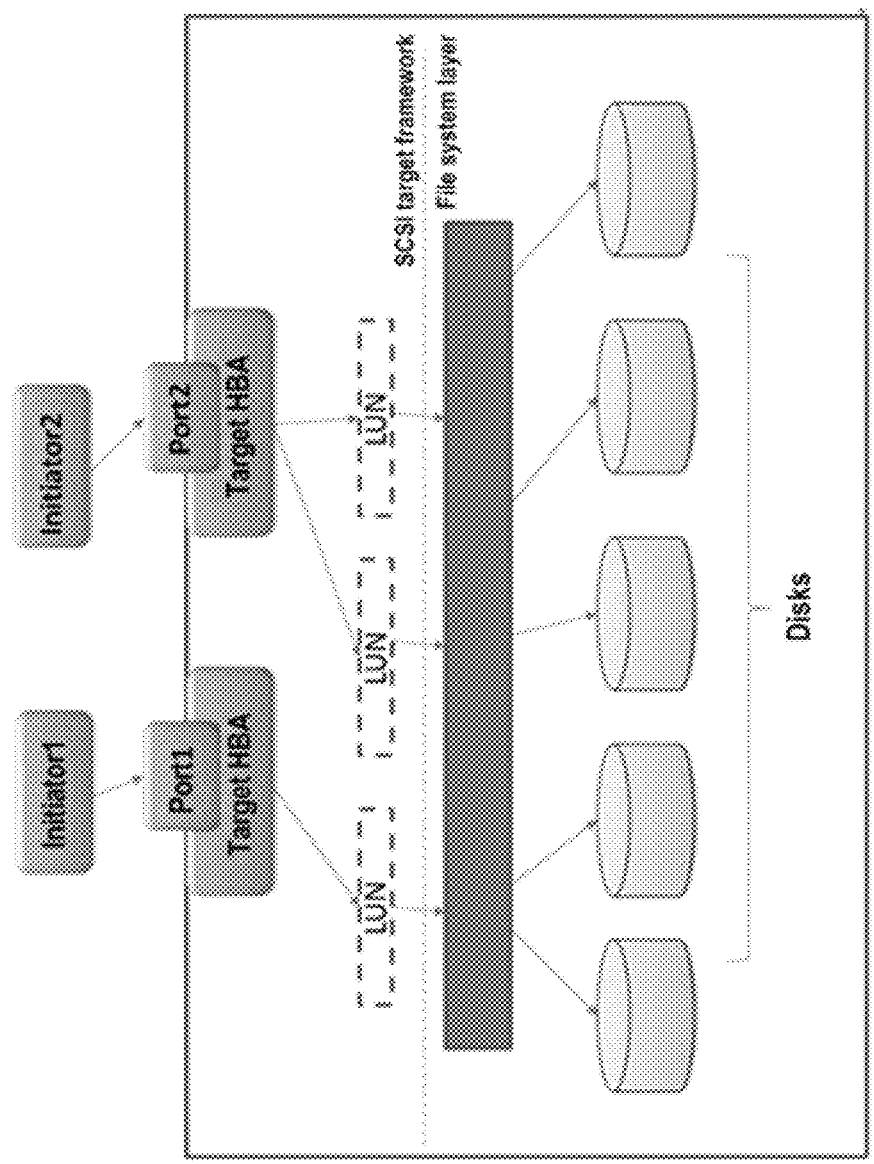
Figure 3:
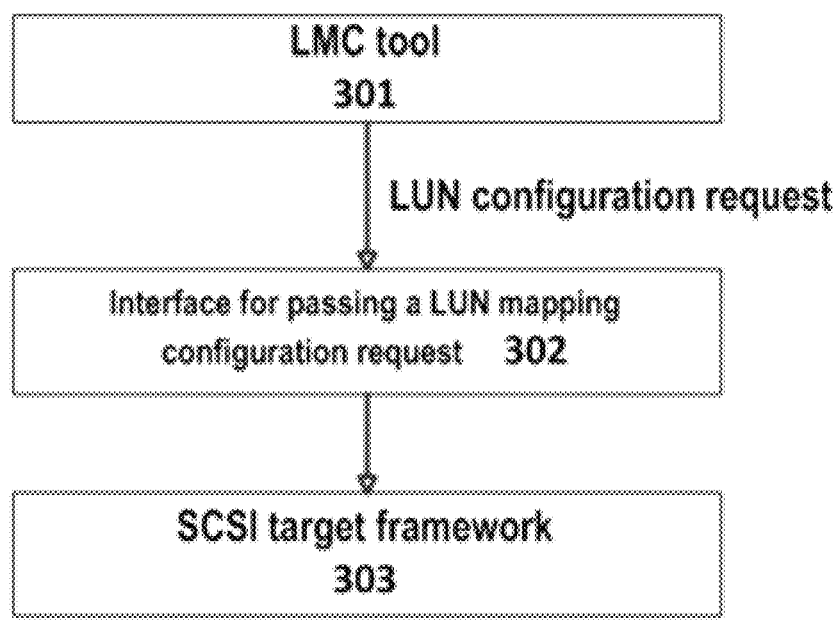
Figure 4:
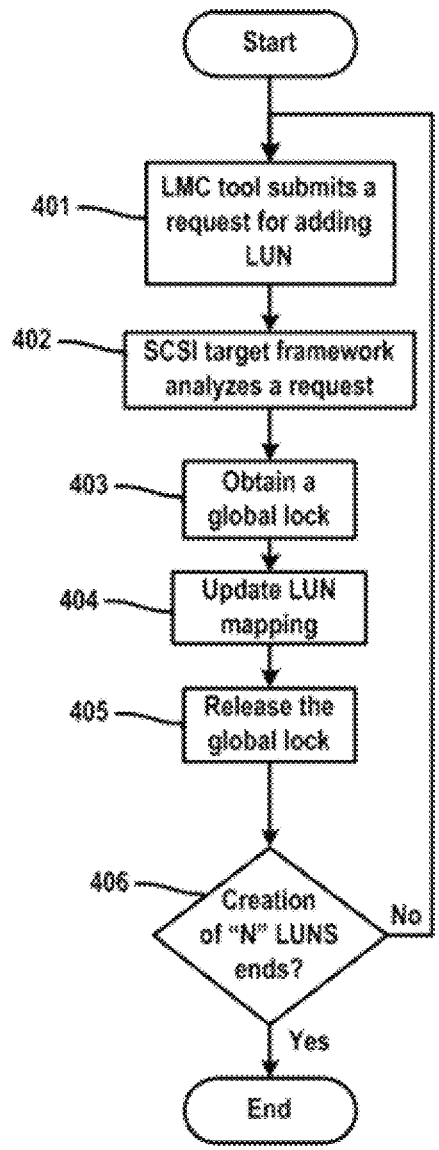
Figure 5:
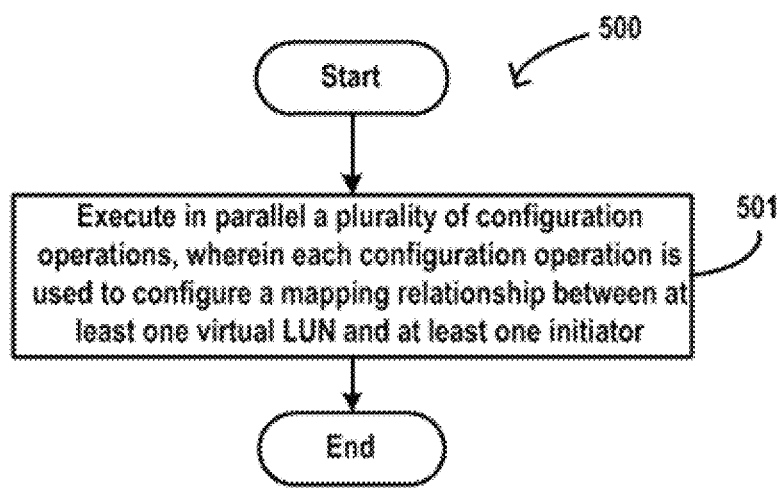
Figure 6:
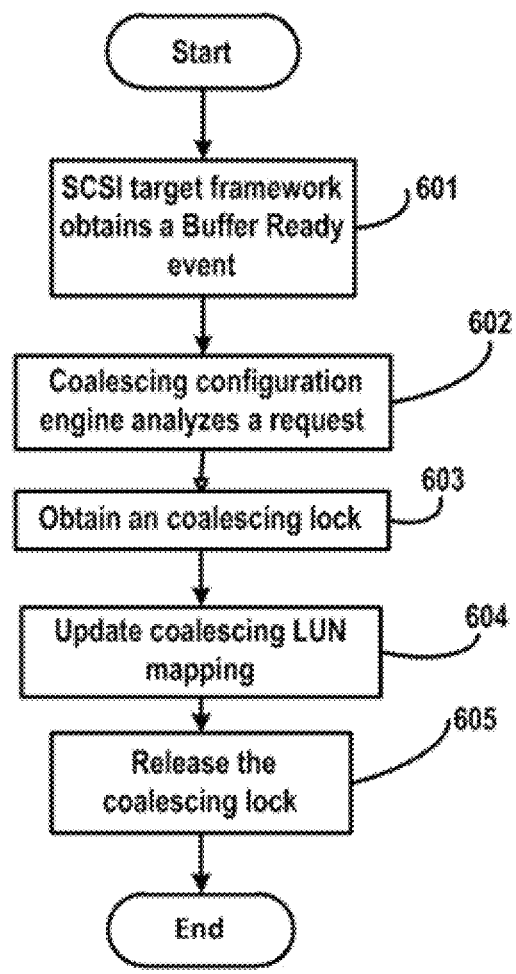
Figure 7:
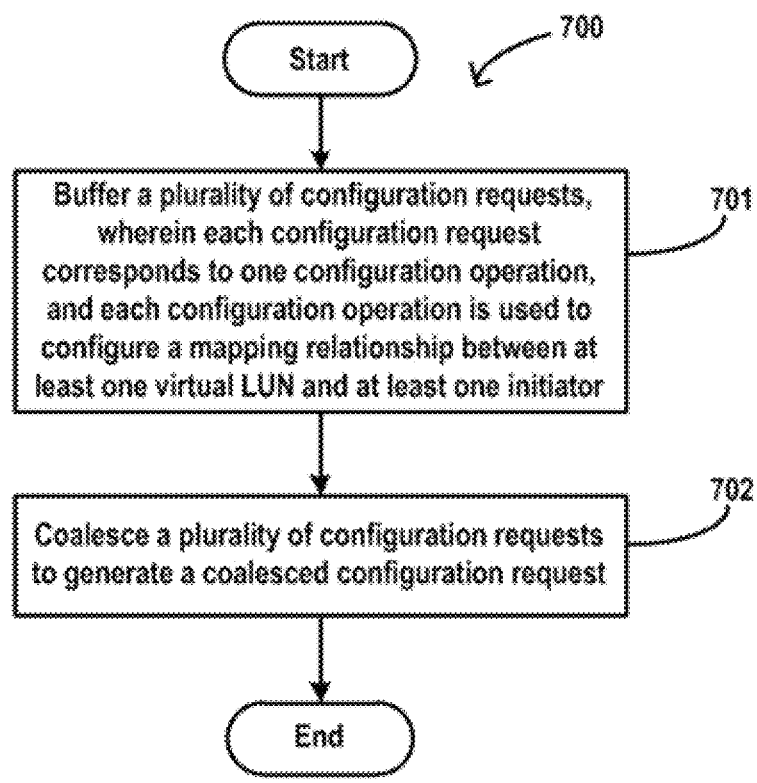
Figure 8:
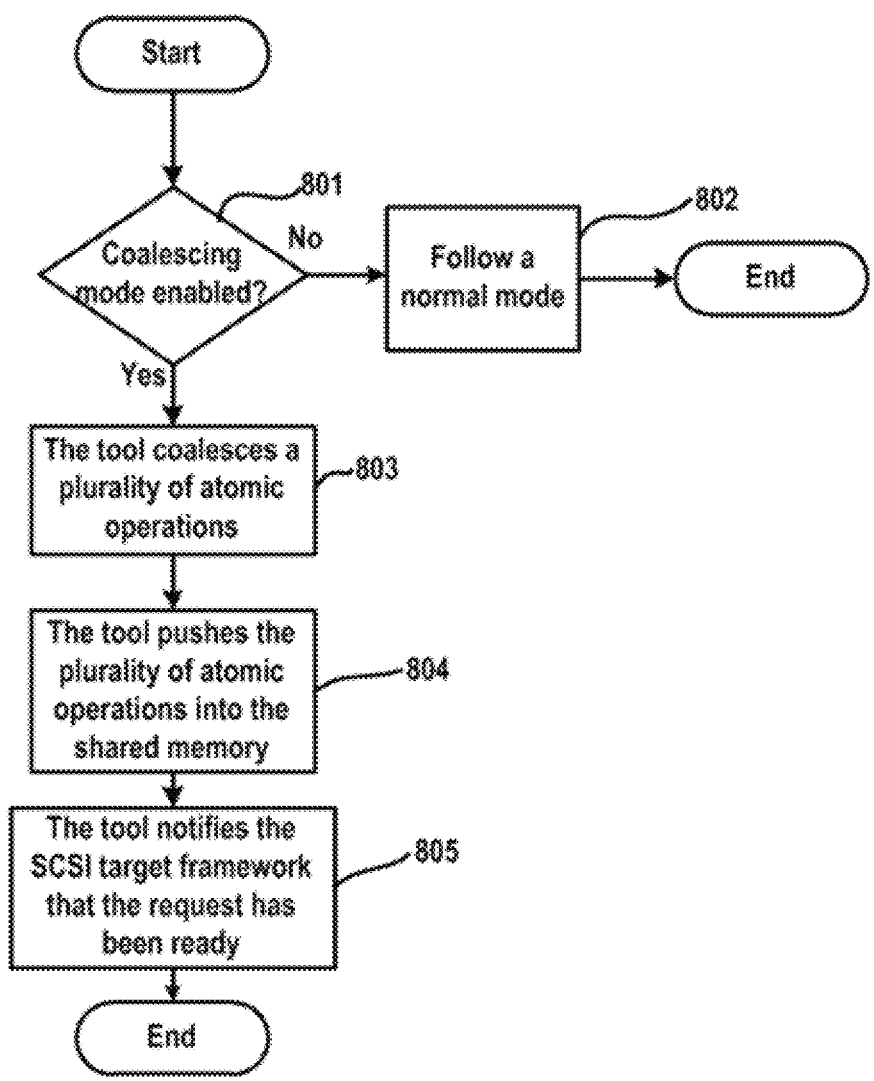
Figure 9:
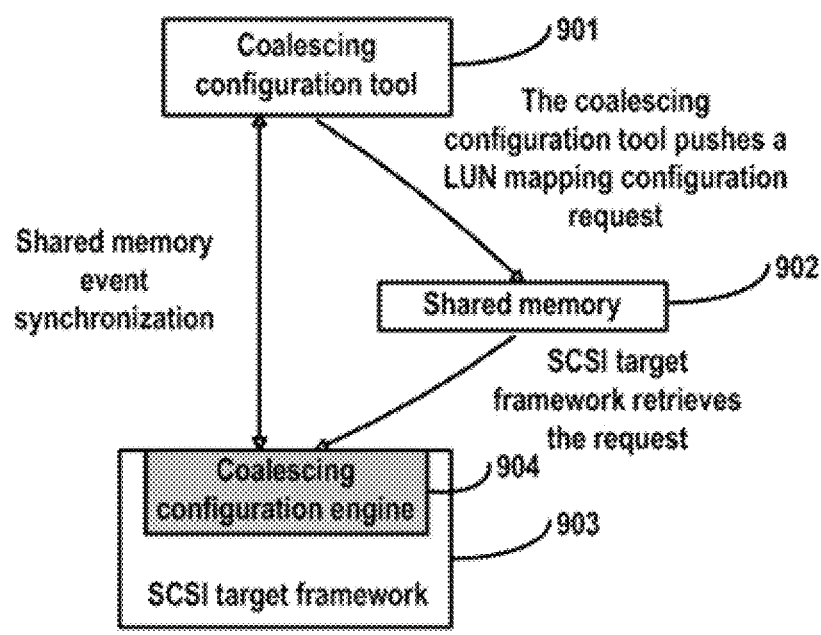
Figure 10:
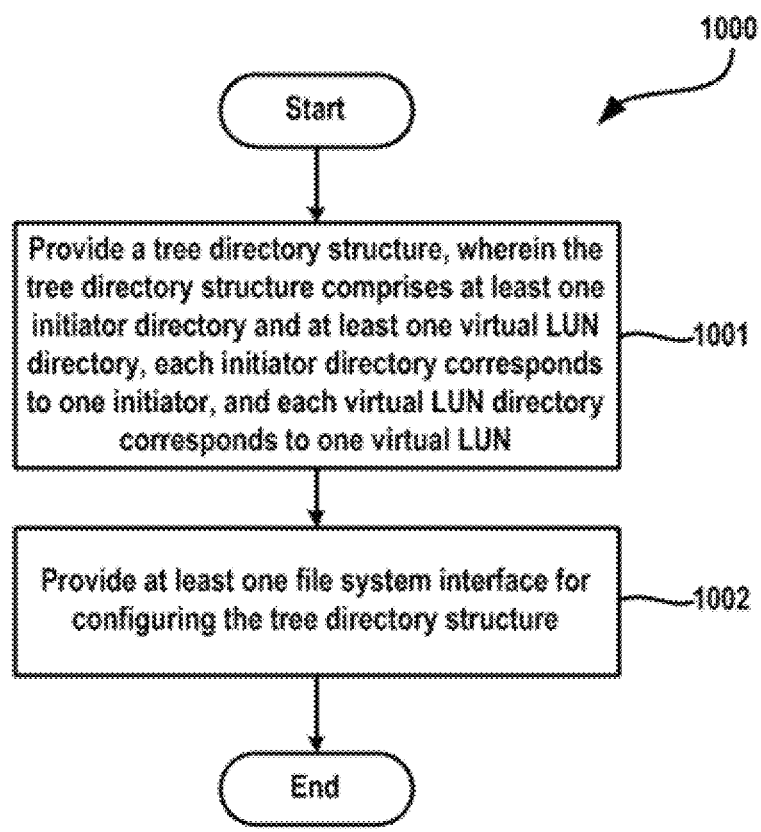
Figure 11:
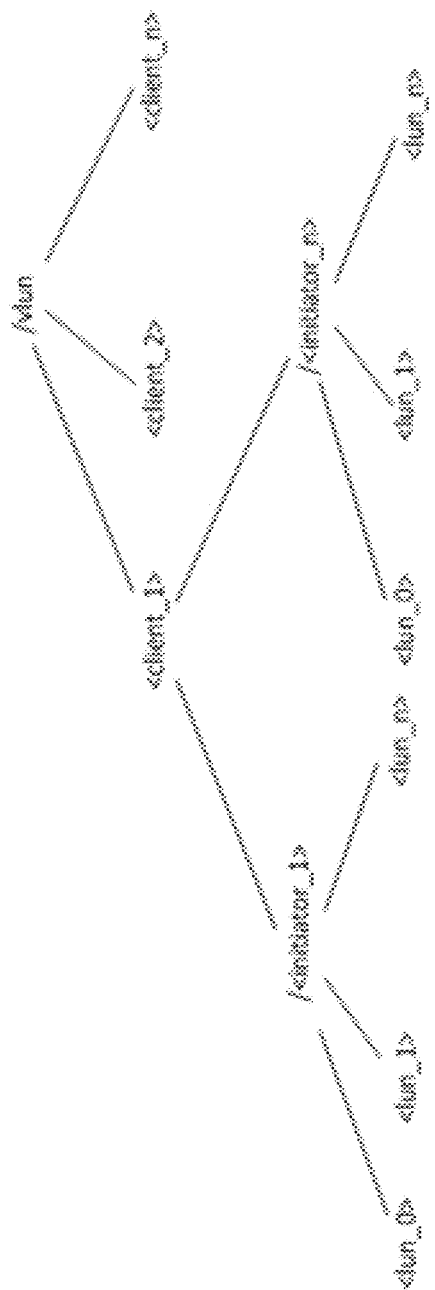
Figure 12:
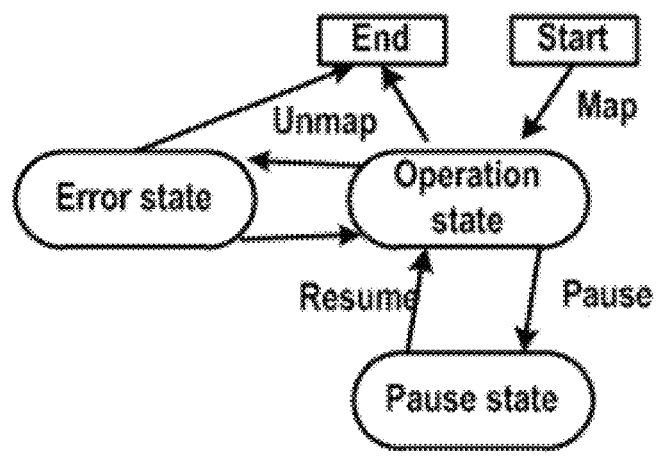
Figure 13:
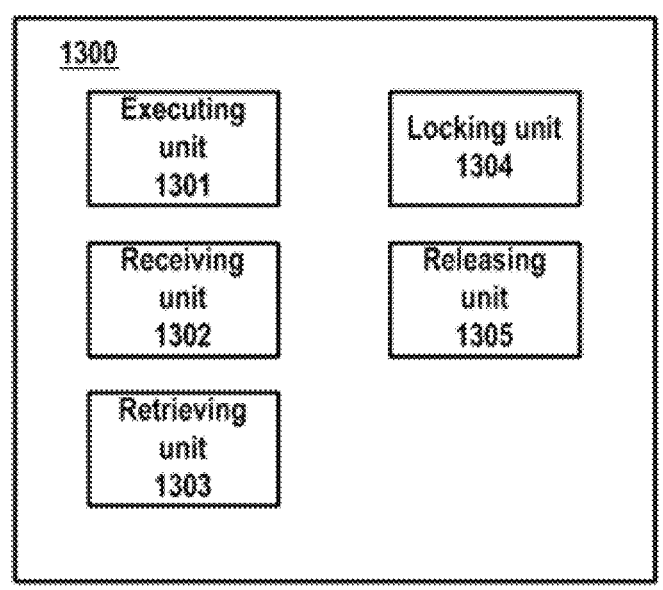
Figure 14:
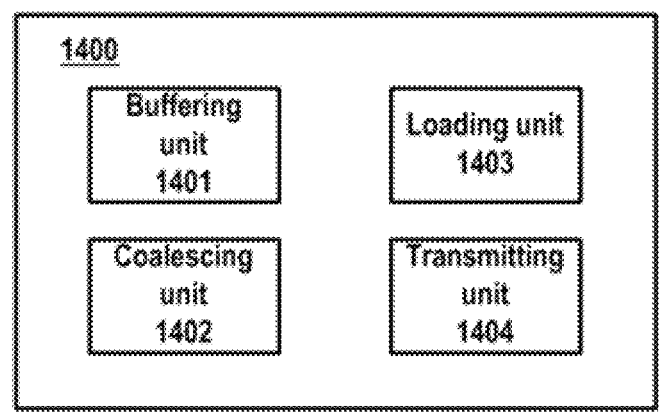
Figure 15:
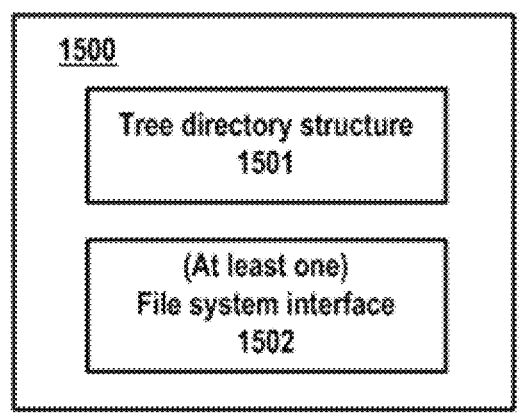
Figure 16:
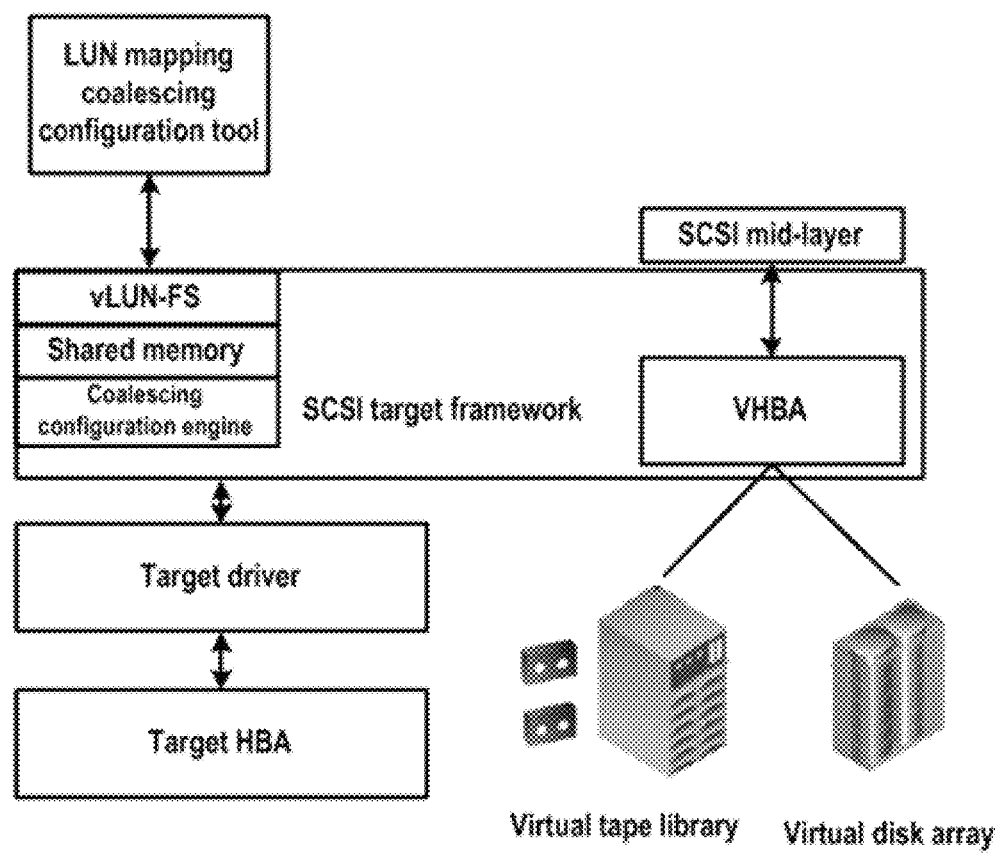
Figure 17:
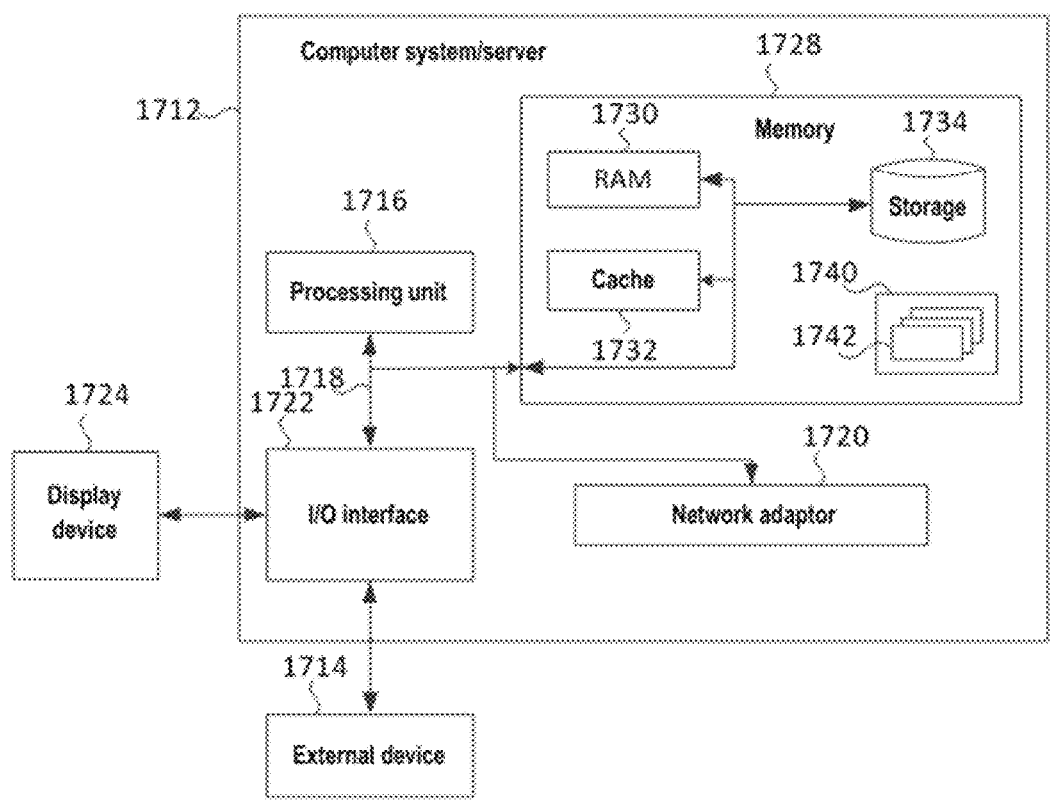

Through reading of following detailed description with reference to the accompanying drawings, the above and other objectives, features and advantages of the embodiments of the present disclosure will become easily comprehensible. In the accompanying drawings, several embodiments of the present disclosure are illustrated in an exemplary and non-limiting manner, wherein:

FIG. 1 schematically shows a typical storage system architecture having an SCSI target framework;

FIG. 2 schematically shows an example of a LUN mapping;

FIG. 3 schematically shows an interface mechanism for LUN mapping configuration;

FIG. 4 schematically shows an exemplary flow for creating N virtual LUNs;

FIG. 5 schematically shows a method for a storage system according to one embodiment of the present disclosure;

FIG. 6 schematically shows an exemplary procedure of a coalescing configuration engine according to one embodiment of the present disclosure;

FIG. 7 schematically shows a method for a storage system according to a further embodiment of the present disclosure;

FIG. 8 schematically shows an exemplary process of a coalescing configuration tool according to one embodiment of the present disclosure;

FIG. 9 schematically shows a schematic diagram of an interaction process among a coalescing configuration tool, a coalescing configuration engine, and a shared memory according to one embodiment of the present disclosure;

FIG. 10 schematically shows a method for a storage system according to one embodiment of the present disclosure;

FIG. 11 schematically shows a layout of a typical file system provided as per FIG. 10 according to the embodiments of the present disclosure;

FIG. 12 schematically shows exemplary state change of virtual LUNs according to the embodiments of the present disclosure;

FIG. 13 schematically shows a coalescing configuration engine for a storage system according to one embodiment of the present disclosure;

FIG. 14 schematically shows a coalescing configuration tool for a storage system according to one embodiment of the present disclosure;

FIG. 15 schematically shows a file system for a storage system according to one embodiment of the present disclosure;

FIG. 16 schematically shows a storage system according to one embodiment of the present disclosure; and FIG. 17 schematically shows a block diagram of an exemplary computer system/server that may be used to implement the embodiments of the present disclosure.

DETAILED DESCRIPTION OF THE PREFERRED EMBODIMENTS

Hereinafter, the principle and spirit of the present disclosure will be described with reference to several exemplary embodiments as shown in the drawings. It should be understood that these specific embodiments are described only for enabling those skilled in the art to better understand and implement the present disclosure, not intended to limit the scope of the present disclosure in any manner.

Generally speaking, all terms used herein should be understood according to their general meanings in the art unless otherwise explicitly stated. Mentioned "a/an/the/said element, device, component, apparatus, unit, step, etc." should be construed as at least one instance of the above element, device, component, apparatus, unit, step, etc., and it is not excluded to comprise a plurality of such elements, devices, components, apparatuses, units, steps, etc., unless otherwise explicitly stated.

In some embodiment, with more and more capacity being provided by deduplication storage systems, an amount of virtual LUNs exported by deduplication storage systems may far exceed the current requirements and those of the past. In some other embodiments, an existing virtual LUN configuration method at least may have the following drawbacks (i) when configuring a considerable number of virtual LUNs, its speed may be slow, and users might have to wait for minutes.

(ii) a procedure of configuring virtual LUNs affects ongoing input/output (IO) operations of other existing virtual LUNs, because a virtual LUNs may be configured one by one, the ongoing IO of other existing virtual LUNs may be repetitively paused to avoid conflicts.

(iii) for administrators, it may be hard to manage a considerable number of virtual LUNs via existing tools, because existing managing tools may not be designed for managing a considerable number of virtual LUNs, and they may be error-prone and cannot employed by administrators to find out a mapping relationship among clients, initiators, and virtual LUNs.

Embodiments of the present disclosure ameliorate these and other possible drawbacks.

In some embodiments, a functionally powerful storage system may be configured to export thousands of virtual LUNs to serve hundreds of applications consuming these LUNs. In an example embodiment, in a storage system that integrates a main storage device and a deduplication device, it may be required to create as many as 16,000 virtual LUNs in the deduplication device to export these virtual LUNs to a next stage as data protection virtual LUNs. In some other embodiments, there may be many SCSI target software frameworks, which may enable a storage apparatus to serve as SCSI targets and export virtual LUNs for accessing and maintaining initiator-LUN mappings, and each initiator accesses a corresponding storage space in a storage system through at least one LUN. In an example embodiment, a Linux-based SCSI target framework may be SCST, tgt, LIO, or the like, while a Solaris-based SCSI target framework may be COMSTAR.

Example embodiments of the present disclosure, provide a method for a storage system that may include at least one initiator, each initiator accessing a corresponding storage space in the storage system via at least one virtual logic unit number LUN, and may further include executing in parallel a plurality of configuration operations, wherein each configuration operation may be used to configure a mapping relationship between at least one virtual LUN and at least one initiator.

In a further embodiment, executing in parallel a plurality of configuration operations may include executing in parallel a plurality of configuration operations based on a coalesced configuration request. In a further embodiment, a coalesced configuration request may be generated by coalescing a plurality of configuration requests, and a plurality of configuration requests correspond to a plurality of configuration operations, respectively.

In some embodiments, executing in parallel a plurality of configuration operations based on a coalesced configuration request may include receiving a message indicating that a coalesced configuration request may be used. A further embodiment may include in response to receiving a message, retrieving a coalesced configuration request from a shared memory, so as to execute in parallel a plurality of configuration operations based on a coalesced configuration request.

In some embodiments, executing in parallel a plurality of configuration operations based on a coalesced configuration request may include in response to retrieving a coalesced configuration request from a shared memory, performing a coalescing lock to input/output operations. A further embodiment may include in response to a coalescing lock to input/output operations, executing in parallel a plurality of configuration operations; and releasing a coalescing lock to the input/output operations.

In some embodiments, each configuration operation may include creating an access group, removing an access group, creating a virtual LUN, removing a virtual LUN, adding an initiator into an access group, removing an initiator from an access group, adding a virtual LUN into an access group, or removing a virtual LUN from an access group.

In one embodiment, a method may include at least one initiator for a storage system. A further embodiment may include each initiator accessing a corresponding storage space in the storage system via at least one virtual logic unit number LUN. A further embodiment may include buffering a plurality of configuration requests, wherein each configuration request corresponds to one configuration operation, and each configuration operation may be used to configure a mapping relationship between at least one virtual LUN and at least one initiator. A further embodiment may include coalescing a plurality of configuration requests to generate a coalesced configuration request.

In some embodiments, the method may include loading a coalesced configuration request into a shared memory, and transmitting a message indicating that a coalesced configuration request may be used. In some embodiments, each configuration operation may include creating an access group, removing an access group, creating a virtual LUN, removing a virtual LUN, adding an initiator into an access group, removing an initiator from an access group, adding a virtual LUN into an access group, or removing a virtual LUN from an access group.

A further embodiment may include providing a tree directory structure. In a further embodiment, a tree directory structure may include at least one initiator directory and at least one virtual LUN directory. In a further embodiment, each initiator directory may correspond to one initiator. In a further embodiment, each virtual LUN directory may correspond to one virtual LUN. A further embodiment may include providing at least one file system interface for configuring a tree directory structure.

In some embodiments, at least one file system interface may include a file system interface for executing in parallel a plurality of configuration operations, and each configuration operation may be used to configure a mapping relationship between at least one virtual LUN and at least one initiator. In some embodiments, a tree directory structure may further include at least one client directory, each client directory corresponding to one client. In some embodiments, a client directory may include a sub-directory of the root directory, a initiator directory may include a sub-directory of a client directory, and a virtual LUN directory may include a sub-directory of an initiator directory.

In some embodiments, at least one file system interface may include a file system interface for at least one of the following: adding or removing a client under a root directory, setting or querying the type or ID of an initiator or a target port ID under an initiator directory, adding or removing a virtual LUN under an initiator directory, setting or querying the type and size of a virtual LUN under a virtual LUN directory, querying a state of a virtual LUN under a virtual LUN directory, or setting or querying a thin provision attribute and redundant attribute of a virtual LUN under a virtual LUN directory. In some embodiments, a virtual LUN may include either one of the following states—an operation state, a pause state, and an error state.

In one embodiment, a coalescing configuration engine may be provided for a storage system. In a further embodiment a storage system may include at least one initiator, and each initiator may access a corresponding storage space in a storage system through at least one virtual logic unit number LUN. In a further embodiment, a coalescing configuration engine may include an executing unit that may be configured to execute in parallel a plurality of configuration operations, wherein each configuration operation may be used to configure a mapping relationship between at least one virtual LUN and at least one initiator.

In one embodiment a coalescing configuration tool may be provided for a storage system. In a further embodiment, a storage system may include at least one initiator, and each initiator may access a corresponding storage space in the storage system through at least one virtual logic unit number LUN. In a further embodiment, a coalescing configuration tool may include a buffering unit that may be configured to buffer a plurality of configuration requests. In a further embodiment, each configuration request may correspond to one configuration operation. In a further embodiment, each configuration operation may be used to configure a mapping relationship between at least one virtual LUN and at least one initiator. In a further embodiment, a coalescing unit may be configured to coalesce a plurality of configuration requests to generate a coalesced configuration request.

In one embodiment a file system may be provided for a storage system. In a further embodiment, a storage system may include at least one initiator. In a further embodiment, each initiator may access a corresponding storage space in a storage system through at least one virtual logic unit number LUN. In a further embodiment, a file system may include a tree directory structure. In a further embodiment, a tree directory structure may include at least one initiator directory and at least one virtual LUN directory. In a further embodiment, each initiator directory may correspond to one initiator. In a further embodiment, each virtual LUN directory may correspond to one virtual LUN; and at least one file system interface for configuring a tree directory structure.

In one embodiment, a computer program product including program codes which, when being executed on a processor, causes a processor to execute the as disclosed above Embodiments of the present disclosure introduce four components in a SCSI target framework in a storage system or interacting with the SCSI target framework, which are namely: a new coalescing configuration tool that may have a coalescing configuration capability, a coalescing configuration engine that may be inserted into a SCSI target framework, a shared memory for use by a coalescing configuration tool and a SCSI target framework for communication, and an independent file system referred to as vLUN-FS, for providing a friendly user interface. In a further embodiment, a coalescing configuration tool may buffer a large amount atomic LUN configuration request, and then may load a coalesced request into a shared memory and may notify a SCSI target framework. In a further embodiment, a coalescing configuration engine may be inserted into a SCSI target framework. In an alternate embodiment, instead of configuring a plurality of virtual LUNs one by one, a coalescing configuration engine may configure a large number of virtual LUNs in one command.

Embodiments of the present disclosure may achieve the following advantages. In one embodiment, it may be very fast to configure a large number of virtual LUNs. As an example, embodiments disclosed herein may configure as many as 16,000 virtual LUNs within several microseconds, where available solutions may typically consume several minutes. A further embodiment may include minimizing influence on ongoing IOs of other virtual LUNs when configuring virtual LUNs. As an example, embodiments disclosed herein may only need to suspend an ongoing IO in the order of microseconds, where existing methods may have to keep suspending/resuming an ongoing IO for many cycles during a configuration procedure of several minutes.

In a further embodiment, a new programming interface may be provided herein, which may be easy to be extended to far more virtual LUNs in the future. In a further embodiment, a new interface may be based on a shared memory, and therefore, theoretically may have no limit to configurations with respect to future expansion. As an example, according to embodiments disclosed herein, ten times or more of the above exemplary number may be realized whereas in contrast, current solution may be subjected to a limit of an interface buffer size, and it may not be designed for a large amount target configurations.

In one embodiment, an independent file system may be provided with a user friendly interface, which may be designed to support administration of a large amount of virtual LUNs. In a further embodiment, it may provide hierarchical management user interfaces, thereby easy to manage different groups of virtual LUNs, and may also be easy to illustrate a mapping relationship among clients, initiators, and virtual LUNs.

FIG. 1 schematically shows a typical storage system architecture having an SCSI target framework. As shown in FIG. 1, clients 1-3 are connected to a deduplication storage system via an Internet protocol/storage area networking (IP/SAN) network. In one embodiment, a deduplication storage system may include a tape & disk simulator, a deduplication file system, an SAS disk interface protocol in use, and a bus adaptor HBA, etc. In a further embodiment, a deduplication storage system may be presented as virtual LUNs of a tape or disk type in the client system. In a further embodiment, a SCSI target framework may enable a deduplication storage system to serve as an SCSI target, and export virtual LUNs as a target type of a tape, a disk, or even others. In a further embodiment, a storage administrator may use a LUN mapping configuration (LMC) tool to manage a mapping relationship of LUNs with respective clients and associated initiators via a configuration interface of a SCSI target framework, including creating a virtual LUN, adding an initiator, etc. In a further embodiment, a LUN mapping may also define a visibility of virtual LUNs to the initiators, which exhibits which initiator may access which virtual LUN. In a further embodiment, a relationship between LUN visibility and initiators may be defined as an access group.

In a further embodiment, an access group-based LUN mapping operation may include one of the following types: creating an access group, removing an access group, creating a virtual LUN, removing a virtual LUN, adding an initiator into an access group, removing an initiator from an access group, adding a virtual LUN into the access group, or removing a virtual LUN from a access group.

FIG. 2 schematically illustrates an example of a LUN mapping. As shown in FIG. 2, initiators 1-2 are mapped to three LUNs through a target host bus adaptor (target HBA) via ports 1-2, respectively. In addition, the three LUNs in the SCSI target framework are further mapped with the physical disks through a file system layer. In an example embodiment, an objective may be to create a mapping from two initiators to three virtual LUNs. In one embodiment, a storage administrator may adopt one of the following operation steps to achieve this objective: 1) creating an access group, 2) creating three virtual LUNs, 3) adding the three virtual LUNs into this access group, and 4) adding initiators 1 and 2 into this access group.

FIG. 3 schematically shows an interface mechanism for LUN mapping configuration. As shown in FIG. 3, LMC tool communicates with a SCSI target framework via a configuration interface. Specifically, the system administrator or user transmits an LUN configuration request via an LMC tool 301 to an interface 302 for passing an LUN mapping configuration request. Further, the interface 302 forwards the request to the SCSI target framework 303 such that the SCSI target framework 303 performs further analysis and processing to the request. In one embodiment, each creating/removing operation may change a LUN mapping. In a further embodiment, a SCSI target framework may update a LUN mapping and may notify any change to initiators.

In one embodiment, in a framework and operation of a typical storage system as described above, each adding/removing operation may affect a LUN mapping. In a further embodiment, any LUN mapping change may affect input/output (IO) operations. In an example embodiment, removing a virtual LUN which is executing an IO operation may cause IO suspension. In a further embodiment, an IO may be held until a configuration has ended. In a further embodiment, in order to reduce an impact on IOs, a SCSI target framework may consider these configuration operations as atomic operations. In a further embodiment, when an atomic operation is performed, a global IO lock may be required and then the IO may be held. In a further embodiment, after end of a configuration operation, a global IO lock may be released and the IO may be resumed.

FIG. 4 schematically shows an exemplary flow 400 for creating N virtual LUNs. In the exemplary flow 400, taking the operation of adding a LUN as an example, a procedure of configuring the LUN is illustrated. However, those skilled in the art would appreciate that other similar configuration operations may also be equivalently executed according to the exemplary flow. The exemplary flow 400 enters into an operation 401 after the start. In Step 401, an LMC tool may submit a request for adding a LUN. In Step 402, a SCSI target framework may analyze the request. In Step 403, the SCSI target framework may obtain a global lock. In Step 404, the SCSI target framework may update the LUN mapping. In Step 405, the SCSI target framework may release the global lock. In Step 406, the SCSI target framework may determine whether creation of the "N" LUNs has ended. If not ended, exemplary flow 400 may return to Step 401 to continue operation of adding a next LUN. If already ended, exemplary flow 400 may end.

In an embodiment with respect to this exemplary flow, if N=100, then creation of 100 virtual LUNs may cause obtaining/releasing cycles for IO lock 100 times. In a further embodiment, a lot of time may be consumed in this process and may be disruptive for IO, and the IO performance may be greatly affected.

In a further embodiment, with more and more capacity provided by deduplication storage systems, an amount of virtual LUNs exported by a deduplication storage system may be far more than the past. In a further embodiment, in a case of a large number of virtual LUNs, the above issue may become more challenging. In a further embodiment, in some real scenarios, as many as 16,000 virtual LUNs may need to be created in a deduplication storage system, so as to export to a next stage as data protection virtual LUNs, in which. case, bring-up of a system might take a couple of seconds or even several minutes.

In an alternate embodiment, as mentioned in the framework above and operation (steps) of a storage system described above, administrators or users interact with a SCSI target framework by a target manager via a/proc file system. In a further embodiment, the/proc file system may not be fast and has a limit in its data buffer size. As an example embodiment, a maximum buffer size of a/proc file system may be 4K bytes. As an example embodiment, a virtual LUN data structure with C code may be as presented below:

```
typedef struct {
    uint16_t lun_id;
    uint8_t portmask[32];
    uint16_t type;
    uint16_t cap;
} virtual_lun_t;
``` wherein each entity of a data structure virtual LUN may occupy 38 bytes. In a further embodiment, considering a scenario of 16,000 virtual LUNs, a buffer size required may be 16,000*38=608,000 bytes, which is substantially greater than 4K bytes. In a further embodiment, if a combination of an access group and an initiator configuration is considered, buffer size required may be even more than 100 MB. In a further embodiment, therefore, a buffer size of a/proc file system may hinder expansion to a large number of LUN configurations.

In an alternate embodiment, in a framework and operation of a storage system described above, administrators or users may not have a good tool to administrate a large number of virtual LUNs. In a further embodiment, existing tools may be capable of handling hundreds of virtual LUNs, but possibly it may be difficult to administer as many as 16,000 virtual LUNs. In a further embodiment, a mapping relationship between an access group and different initiators may be considered, wherein administration of a large number of virtual LUNs may become more challenging.

Embodiments of the present disclosure provide the following in order to solve the above mentioned problems.

In a first embodiment, a coalescing configuration engine may be provided in a SCSI target framework. In a further embodiment, instead of configuring virtual LUNs one by one, a coalescing configuration engine may configure a large number of virtual LUNs in a single command. In a further embodiment, a configuration procedure may be very fast and may also minimize an impact on ongoing IOs of other virtual LUNs.

In a second embodiment, a new programming interface based on a shared memory may be provided to pass a large amount of information for LUN mapping configuration. As an example embodiment, in a case of creating 16,000 virtual LUNs, a size of configuration information to pass may exceed 100 MB. In a further embodiment, a new programming interface may save a large buffer copy from a target manager to a SCSI target framework, such that it may be far efficient than existing interfaces.

In a third embodiment, a new user interface based on a hierarchical file system structure may be provided. In a further embodiment, as mentioned above, it may be a challenging issue to manage a large number of virtual LUNs. In a further embodiment, a file system called vLUN-FS may be proposed to facilitate presenting of a user friendly interface. In a further embodiment, a new user interface may provide a hierarchical view for clients, initiators, and virtual LUNs, and, may implement management operations on different target layers.

FIG. 5 schematically shows a method 500 for a storage system according to one embodiment of the present disclosure. Method 500 may be used in various storage systems. These storage systems may comprise at least one initiator, each initiator accessing a corresponding storage space in a storage system via at least one virtual logic unit number LUN. In one embodiment, method 500 may be executed by a coalescing configuration engine for configuring a mapping relationship between virtual LUNs and initiators in an SCSI target framework in a storage system.

Referring to FIG. 5, in step 501, a plurality of configuration operations are executed in parallel, wherein each configuration operation is used to configure a mapping relationship between at least one virtual LUN and at least one initiator. In one embodiment, by executing in parallel a plurality of configuration operations instead of configuring the operations on a virtual LUNs one by one, the method 500 may perform operations on a large number of virtual LUNs in a single command, or configure configuration operations associated with a large number of virtual LUNs in a single time period. In a further embodiment, method 500 may make a mapping configuration procedure between a LUN and an initiator very fast and may also minimize an impact on ongoing IO of other virtual LUNs.

According to some embodiments of the present disclosure, step 501 may further include: executing in parallel a plurality of configuration operations based on a coalesced configuration request, wherein the coalesced configuration request may be generated by coalescing a plurality of configuration requests. In a further embodiment, a plurality of configuration requests may correspond to a plurality of configuration operations. In a further embodiment, other entities in a storage system, e.g., a coalescing configuration tool may perform a coalescing operation on a plurality of configuration requests, and may firstly coalescing a plurality of configuration requests so as to generate a coalesced configuration request, after receiving these configuration requests from an administrator or user. In a further embodiment, an entity may then directly transfer a coalesced configuration request to an executing entity of method 500, or may transfer a coalesced configuration request to an executing entity of method 500 through a certain intermediate means or media. In a further embodiment, executing entity of method 500 may execute in parallel a plurality of configuration operations based on the coalesced configuration request.

In a further embodiment, it may be noted that besides being based on a coalesced configuration request, executing a plurality of configuration operations in parallel may also have many different embodiments. In an example embodiment, executing in parallel a plurality of configuration operations may include executing in parallel a plurality of configuration operations received within a certain period, or executing in parallel operations for some initiators, etc. Those skilled in the art would appreciate that the scope of the present disclosure is not limited thereto.

According to some embodiments, executing in parallel a plurality of configuration operations based on a coalesced configuration request may further include receiving a message indicating that a coalesced configuration request may be used. In a further embodiment, in response to receiving a message, retrieving a coalesced configuration request from a shared memory, so as to execute in parallel a plurality of configuration operations based on the coalesced configuration request.

In aspect further embodiment, an entity for coalescing a plurality of configuration requests, e.g., a coalescing configuration tool, may transmit to an executing entity of method 500 a message indicating that a coalesced configuration request may be used, after the coalescing is completed and loading a coalesced configuration request to a shared memory, which is accessible to the executing entity of method 500. In a further embodiment, after an executing entity of method 500 receives a message, it may retrieve a coalesced configuration request from a shared memory, so as to execute in parallel a plurality of configuration operations based on a coalesced configuration request. In a further embodiment, additionally besides using a shared memory, an entity for performing a coalescing of a plurality of configuration requests may also employ various other manners to pass a coalesced configuration request to an executing entity of method 500, e.g., directly transferring it to an executing entity of method 500. In a further embodiment, additionally besides using a notification message, an entity for performing a coalescing of a plurality of configuration requests may also employ various other manners to notify an executing entity of method 500 that a coalesced configuration request is ready.

In addition, for an embodiment of using a shared memory, a coalescing configuration tool may communicate with a target interface in the SCSI target framework via a shared memory interface. In a further embodiment, a coalescing configuration engine may create an area in a RAM, which area may be accessed by a SCSI target framework. In a further embodiment, a coalescing configuration tool may write configuration update requests into a shared memory, and then transmits a New Data (i.e., coalesced configuration request) Arrival event to a SCSI target framework. In a further embodiment, a SCSI target framework may retrieve a request and correspondingly update a target system, and then transmits retrieved data event to a target manager.

In a further embodiment, using a shared memory may be an advantage that supports transfer of large amounts of data between a target manager and a SCSI target framework. In a further embodiment, a parallel configuration coalesces a large number of LUN mapping operations into one mapping operation, which requires a large data buffer for communication between a target manager and a SCSI target framework. In a further embodiment, if a shared memory is used, there may be no memory copying during this procedure, which can improve a performance in a LUN mapping procedure.

According to some embodiments, executing in parallel a plurality of configuration operations based on a coalesced configuration request may further include in response to retrieving a coalesced configuration request from a shared memory, performing a coalescing lock to input/output operations. A further embodiment may include in response to a coalescing lock to input/output operations, executing in parallel a plurality of configuration operations. A further embodiment may include releasing a coalescing lock to the input/output operations.

In a further embodiment, before executing in parallel a plurality of configuration operations, an executing entity of method 500 may perform a coalescing lock to input/output (IO) operations. In a further embodiment, during this period, input/output operations may be paused. In a further embodiment, after completing a parallel execution of a plurality of configuration operations, a method 500 releases a coalescing lock to input/output operations, such that input/output operations may continue. In a further embodiment, possible occurrence of input/output operation errors may be avoided during a parallel execution of a plurality of configuration operations.

According to some embodiments, each configuration operation in method 500 may include creating an access group, removing an access group, creating a virtual LUN, removing a virtual LUN, adding an initiator into an access group, removing an initiator from an access group, adding a virtual LUN into an access group, or removing a virtual LUN from an access group. In some other embodiments, a mapping from virtual LUNs to initiators based on an access group is only an embodiment of mapping there between, and other mapping techniques may be employed.

FIG. 6 schematically shows an exemplary procedure 600 of a coalescing configuration engine according to one embodiment of the present disclosure. Exemplary procedure 600 may be executed by an SCSI target framework having a coalescing configuration engine that executes in parallel a plurality of configuration operations, wherein each configuration operation may be used to configure a mapping between a virtual LUN and an initiator. Exemplary procedure 600 enters into step 601 after start. In step 601, a SCSI target framework may obtain a Buffer Ready event in step 602, a coalescing configuration engine in a SCSI target framework may analyze the request, wherein the request is a coalesced configuration request resulting from a plurality of atomic configuration requests. In step 603, a coalescing lock may be achieved to suspend relevant input/output operations, so as to execute in parallel configuration operations based on the coalesced configuration request, namely, executing in parallel a plurality of configuration operations corresponding to a plurality of atomic configuration requests included in the coalesced configuration request. In step 604, a coalesced LUN mapping may be updated, i.e., executing in parallel the plurality of configuration operations corresponding to the plurality of atomic configuration requests in association. In step 605, a coalescing lock may be released so as to resume the associated input/output operations. After step 605, exemplary procedure 600 may end. In a specific embodiment, a Buffer Ready event here may be an event that an entity for coalescing a plurality of configuration requests has placed the coalesced configuration request in a shared memory, wherein each configuration request may correspond to one configuration operation.

FIG. 7 schematically shows a method 700 for a storage system according to another embodiment of the present disclosure. As shown in FIG. 7, method 700 enters step 701 after start. In step 701, a plurality of configuration requests are buffered, wherein each configuration request corresponds to one configuration operation, and each configuration operation is used to configure a mapping relationship between at least one virtual LUN and at least one initiator. Then, method 700 proceeds to step 702, wherein a plurality of configuration requests are coalesced to generate a coalesced configuration request. In some embodiments, an executing entity of method 700, after receiving a plurality of configuration requests between virtual LUNs and initiators from an administrator or user, buffers a plurality of configuration requests, so as to perform coalescing processing to these configuration requests. In some other embodiments, method 700 may be used in various storage systems that may include at least one initiator, each initiator accessing a corresponding storage space in a storage system through at least one virtual logic unit number LUN. In some other embodiments, method 700 may be executed by a coalescing configuration tool in a storage system, which may be used by a user for interacting with a SCSI target framework.

According to some embodiments, method 700 may further include: loading a coalesced configuration request into a shared memory, and transmitting a message indicating that a coalesced configuration request may be used. In aspect further embodiment, an executing entity of method 700 loads a coalesced configuration request to a shared memory that may be accessed by an executing entity of method 500, and transmits to an executing entity of method 500 a message indicating that a coalesced configuration request may be used. In a further embodiment, an executing entity of method 500, after receiving a message, may retrieve a coalesced configuration request from a shared memory, so as to execute in parallel a plurality of configuration operations corresponding to a plurality of configuration requests included in a coalesced configuration request.

In a further embodiment, besides using a shared memory, an executing entity of method 700 may also employ various other manners to pass the coalesced configuration request to the executing entity of method 500, e.g., directly passing it to the executing entity of method 500. In a further embodiment, besides using a notification message, an executing entity of method 700 may also employ various other manners to notify an executing entity of method 500, and a coalesced configuration request may be ready According to some embodiments, each configuration operation in method 700 may include creating an access group, removing an access group, creating a virtual LUN, removing a virtual LUN, adding an initiator into an access group, removing an initiator from an access group, adding a virtual LUN into an access group, or removing a virtual LUN from an access group. In some embodiments, a mapping from virtual LUNs to initiators based on an access group is only one embodiment of mapping there between, and other mapping manner may be employed as required FIG. 8 schematically shows an exemplary procedure 800 of a coalescing configuration tool according to one embodiment of the present disclosure. Exemplary procedure 800 may be executed by a coalescing configuration tool that performs a coalescing operation on a plurality of configuration requests, wherein each configuration request corresponds to one configuration operation, each configuration operation being for configuring a mapping between a virtual LUN and an initiator. Exemplary procedure 800 enters into operation 801 after start. In operation 801, a coalescing configuration tool may determine whether a coalescing mode is enabled. If not enabled, in operation 802, coalescing configuration tool may follow a normal node to operate, i.e., executing a configuration operation corresponding to each configuration request one by one. After configuration operations corresponding to all configuration requests are completely executed, exemplary procedure 800 may end. If a result of determining in operation 801 is that a coalescing mode is enabled, then exemplary procedure 800 may proceed to operation 803, in which a coalescing configuration tool may coalesce a plurality of atomic configuration operations. In operation 804, the coalescing configuration tool may push a plurality of atomic configuration operations into a shared memory, i.e., loading a coalesced configuration request into a shared memory, such that a coalescing configuration engine in a SCSI target framework may retrieve a coalesced configuration request. In operation 805, the coalescing configuration tool may notify the SCSI target framework that the coalesced configuration request is ready. Thereafter, exemplary procedure 800 may end.

FIG. 9 schematically shows a schematic diagram of an interaction process among a coalescing configuration tool 901, a coalescing configuration engine 904 in a SCSI target framework 903, and a shared memory 902 according to one embodiment of the present disclosure. As shown by the two arrows, right side arrow in FIG. 9 indicates that a coalescing configuration tool 901 may push a coalesced configuration request into a shared memory 902. A coalescing configuration engine in a SCSI target framework 903 may retrieve a request from the shared memory 902. In addition, as shown by the arrow on the left in FIG. 9, a synchronization operation between a coalescing configuration tool 901 and a coalescing configuration engine 904 may be performed for events of a shared memory 902. For example, the coalescing configuration tool 901, after loading the coalesced configuration request into the shared memory 902, may transmit a message to notify the coalescing configuration engine. The coalescing configuration engine 904 may also, after retrieving the coalesced configuration request, transmits a message to notify the coalescing configuration tool 901.

FIG. 10 schematically shows a method 1000 for a storage system according to one embodiment of the present disclosure. As illustrated in FIG. 10, method 1000 enters into step 1001 after start. In step 1001, a tree directory structure is provided, wherein the tree directory structure includes at least one initiator directory and at least one virtual LUN directory, each initiator directory corresponds to an initiator, and each virtual LUN directory corresponds to a virtual LUN. Next, method 1000 may proceed to step 1002, where, at least one file system interface for configuring the tree directory structure is provided. According to some embodiments, method 1000 may be used in various storage systems that may comprise at least one initiator, each initiator accessing a corresponding storage space in a storage system through at least one virtual logic unit number LUN. In one embodiment, method 1000 may be used by an administrator or user of a storage system to create a file system for use in the storage system so as to administer a mapping relationship among clients, initiators, and virtual LUNs.

According to some embodiments, at least one file system interface may include a file system interface for executing in parallel a plurality of configuration operations, and each configuration operation is used to configure a mapping relationship between at least one virtual LUN and at least one initiator. According to some other embodiments, a tree directory structure may further include at least one client directory, each client directory corresponding to one client. According to some other, a client directory may be a sub-directory of a root directory, an initiator directory may be a sub-directory of a client directory, and a virtual LUN directory may be a sub-directory of an initiator directory.

According to some embodiments, at least one file system interface may also include a file system interface for at least one of the following: adding or removing a client under the root directory, setting or querying the type or ID of an initiator or a target port ID under an initiator directory, adding or removing a virtual LUN under an initiator directory, setting or querying the type and size of a virtual LUN under a virtual LUN directory, querying a state of a virtual LUN under a virtual LUN directory, or setting or querying a thin provision attribute and redundant attribute of a virtual LUN under a virtual LUN directory. According to some other embodiments, states of a virtual LUN may include an operation state, a pause state, and an error state.

FIG. 11 schematically shows a typical layout of a file system provided according to method 1000 according to embodiments of the present disclosure. As illustrated in FIG. 11, under the root directory/vlun of the tree structure directory, there is at least one client directory <client_1>, <client_2>, . . . , <client_n>, etc.; and downward, there are directories of the initiators of respective clients, <initiator_1>, <initiator_2>, . . . , <initiator_n>, etc.; and still downward, there are directories of virtual LUNs corresponding to respective initiators: <lun_0>, <lun_1>, . . . , <lun_n>, etc. The file system as depicted in FIG. 11 is used to administer and configure virtual LUNs in a target storage system, and may be schematically referred to as vLUN-FS. The interfaces in a file system are universal, and in one embodiment, a Linux system may be used for exhibiting an example of the file system layout. In a further embodiment, a file system may be hierarchical and flexible, which may be used to manage a virtual LUN or configure a large number of virtual LUNs in a single given instant of time. In a further embodiment, a vLUN-FS (as shown in FIG. 11) may be installed in any directory. In a further embodiment, vLUN-FS may be schematically installed in a/vlun directory.

In one embodiment, in a typical storage area network (SAN), one storage system may always be shared by many storage clients. In a further embodiment, each client may have its own storage allocation requirements. In a further embodiment, one client may have a plurality of storage initiators to access a same storage system. In a further embodiment, each initiator may have its own LUN mapping in a target storage system. In a further embodiment, for SANs having different connections, initiators may use different names In a further embodiment, for an optical channel SAN, a global port name (WWPN) may be used; i.e., for IP SAN, an IP address may be used; for Ethernet optical fiber channel (FCoE) SAN, WWPN or MAC address may also be used. In a further embodiment, each initiator may have its own friendly initiator name In a further embodiment, one initiator may have its own directory, e.g., /vlun/<client>/<initiator>/. In a further embodiment, various interfaces that may be provided by a file system vLUN-FS will be introduced.

According to some embodiments, each operation of a vLUN-FS interface may support a single virtual LUN and may also support adding/removing of a plurality of virtual LUNs. In some other embodiments, in a normal operation mode, the following file system interfaces may be used for client management.

/vlun/add: this interface may be used to add a new client that will use a storage device by writing a new client name.

/vlun/remove: this interface may be used to remove an old client using a storage device by writing a new client name.

In some additional embodiments, initiators may be managed by using these following file system interfaces.

/vlun/<client>/<initiator_name>/type: this interface may be used to set or query a type of this initiator group: FCOE, FCSAN, or IPSAN.

/vlun/<client>/<initiator_name>/id: this interface may be used to set or query an ID of an initiator: WWPN, MAC, or IP string.

/vlun/<client>/<initiator_name>/target_port_id: this interface may be used to set or query a corresponding target port ID of this initiator.

In some other embodiments, different initiators may access a plurality of target ports in a storage system, and they see different LUN mappings having different target ports. In addition, id and target_port_id should have the same type.

In some other embodiments, after an initiator ID and type are set, the following file system interfaces may be used to add/remove virtual LUNs for this initiator.

/vlun/<client>/<initiator_name>/map: this interface may be used to map a designated virtual LUN numbers: 0~16383.

/vlun/<client>/<initiator_name>/unmap: this interface may be used to un-map a designated virtual LUN numbers: 0~16383.

/vlun/<client>/<initiator_name>/<lun>/type: this interface may be used to set or query the type of a virtual LUN: magnetic disk, magnetic tape, processor, or medium changer.

/vlun/<client>/<initiator_name>/<lun>/state: this interface may be used to query the state of a virtual LUN: an operation state, a pause state, or an error state.

FIG. 12 schematically shows an exemplary state change of a virtual LUN according to a embodiments of the present disclosure. As illustrated in FIG. 12, after a virtual LUN is mapped by an administrator or user, a virtual LUN will enter into an operation state. If the virtual LUN encounters an initialization or resource limitation problem, it may enter into an error state. When the administrator maps a new virtual LUN, it will affect the states of other virtual LUNs. This will suspend other virtual LUNs, and they will enter into a pause state. After the mapping is completed, these virtual LUNs will resume the operation state.

/vlun/<client>/<initiator_name>/<lun>/size: this interface may be used to set or query a size of a virtual LUN.

/vlun/<client>/<initiator_name>/<lun>/thinprovision: this interface may be used to enable/disable a thin provision feature of a virtual LUN. Particularly for some deduplication storage systems, the feature may be implemented with a minimum effort.

/vlun/<client>/<initiator_name>/<lun>/redundancy: this interface may be used to set or query a redundancy of a virtual LUN. Redundancy means how many disks failing can be tolerated by this virtual LUN cat the same time. For example, if it is 2, this means that the storage backup needs to use RAID6 to provide a real storage space for this virtual LUN.

/vlun/<client>/<initiator_name>/coalescing: by writing "add LUN=0-16383 GUID=auto size=100G redundancy=2 type=disk" into /sys/class/storage_initiators/<initator_name>/coalescing, 16,384 disk virtual LUNs may be added in a coalescing mode, and a size of each LUN may be 100G; they can tolerate failure of 2 disks, and the GUID of each disk will be automatically generated.

In some embodiments, as mentioned above, in a normal operation mode, it may be required to map each virtual LUN one by one to designate a configuration of each virtual LUN. In some other embodiment, this may be a lengthy and time-consuming process. According to some embodiments, a coalescing configuration mode may be defined in an independent vLUN-FS file system interface. According to some other embodiments, in a coalescing configuration mode, one-time adding/removing of as many as 16,384 virtual LUNs may be supported through the following interface.

FIG. 13 schematically shows a coalescing configuration engine 1300 for a storage system according to one embodiment of the present disclosure. Coalescing configuration engine 1300 may be used for various storage systems that may include at least one initiator, and each initiator may access a corresponding storage space in a storage system through at least one virtual logic unit number LUN.

As shown in FIG. 13, coalescing configuration engine 1300 may include executing unit 1301 that may be configured to execute in parallel a plurality of configuration operations, wherein each configuration operation is used to configure a mapping relationship between at least one virtual LUN and at least one initiator. Executing unit 1301 may be further configured to execute in parallel a plurality of configuration operations based on a coalesced configuration request, wherein a coalesced configuration request is generated by coalescing a plurality of configuration requests that correspond to a plurality of configuration operations, respectively.

Coalescing configuration engine 1300 may further include: receiving unit 1302 that may be configured to receive a message indicating that the coalesced configuration request may be used. Coalescing configuration engine 1300 may further include a retrieving unit 1303 that may be configured to, in response to receiving the message, retrieve the coalesced configuration request from a shared memory, so as to execute in parallel a plurality of configuration operations based on the coalesced configuration request.

Coalescing configuration engine 1300 may further include: a locking unit 1304 that may be configured to, in response to retrieving the coalesced configuration request from the shared memory, perform a coalescing lock to input/output operations. Executing unit 1301 may also be configured to, in response to the coalescing lock to the input/output operations, execute in parallel the plurality of configuration operations. Further, coalescing configuration engine 1300 may further include a releasing unit 1305 that may be configured to release the coalescing lock to the input/output operations. In one embodiment each separate unit executing unit 1301, receiving unit 1302, retrieving unit 1303, locking unit 1304 and releasing unit 1305 may be combined into a single unit, coalescing configuration engine 1300, which may perform the tasks of each of the sub-unit in an ordered manner as disclosed above.

According to some embodiments, each configuration operation may include: creating an access group, removing an access group, creating a virtual LUN, removing a virtual LUN, adding an initiator into an access group, removing an initiator from an access group, adding a virtual LUN into an access group, or removing a virtual LUN from an access group.

FIG. 14 schematically shows a coalescing configuration tool 1400 for a storage system according to one embodiment of the present disclosure. Coalescing configuration tool 1400 may be used for various storage systems that may comprise at least one initiator, and each initiator may access a corresponding storage space in a storage system through at least one virtual logic unit number LUN. As shown in FIG. 14, coalescing configuration tool 1400 may include buffering unit 1401 that may be configured to buffer a plurality of configuration requests, wherein each configuration request corresponds to one configuration operation, and each configuration operation is used to configure a mapping relationship between at least one virtual LUN and at least one initiator. In addition, coalescing configuration tool 1400 may further include coalescing unit 1402 that may be configured to coalesce a plurality of configuration requests to generate a coalesced configuration request. Coalescing configuration tool 1400 may further include loading unit 1403 that may be configured to load the coalesced configuration request into the shared memory. Coalescing configuration tool 1400 may further include transmitting unit 1404 that may be configured to transmit a message indicating that the coalesced configuration request may be used. In one embodiment each separate unit i.e., buffering unit 1401, coalescing unit 1402, loading unit 1403 and transmitting unit 1404 may be combined into a single unit, coalescing configuration tool 1400, which may perform the tasks of each of the sub-unit in an ordered manner as disclosed above.

According to some embodiments, each configuration operation may include: creating an access group, removing an access group, creating a virtual LUN, removing a virtual LUN, adding an initiator into an access group, removing an initiator from an access group, adding a virtual LUN into an access group, or removing a virtual LUN from an access group.

FIG. 15 schematically shows a file system 1500 for a storage system according to one embodiment of the present disclosure. File system 1500 may be used for various storage systems. File system 1500 includes a tree directory structure 1501 that may include at least one initiator directory and at least one virtual LUN directory, each initiator directory corresponding to one initiator, and each virtual LUN directory corresponds to a virtual LUN. File system 1500 may further include at least one file system interface 1502 that may be used to configure the tree directory structure. In some embodiments, these storage systems may comprise at least one initiator, and each initiator may access a corresponding storage space in the storage systems through at least one virtual logical unit number LUN.

According to some embodiments, at least one file system interface 1502 may comprise a file system interface for executing in parallel a plurality of configuration operations, and each configuration operation is used to configure a mapping relationship between at least one virtual LUN and at least one initiator. According to some embodiments, a tree directory structure 1501 may further include at least one client directory, and each client directory may correspond to one client. According to some embodiments, a client directory may be a sub-directory of the root directory, an initiator directory may be a sub-directory of a client directory, and a virtual LUN directory may be a sub-directory of an initiator directory.

According to some embodiments, at least one file system interface 1502 may comprise a file system interface for at least one of the following: adding or removing a client under a root directory, setting or querying a type or ID of an initiator or a target port ID under an initiator directory, adding or removing a virtual LUN under an initiator directory, setting or querying a type and size of an virtual LUN under a virtual LUN directory, querying a state of an virtual LUN under a virtual LUN directory, or setting or querying a thin provision attribute and redundant attribute of an virtual LUN under a virtual LUN directory. According to some embodiments, states of a virtual LUN may include: an operation state, a pause state, and an error state.

FIG. 16 schematically shows a storage system according to one embodiment of the present disclosure. As shown in FIG. 16, an administrator or user may interact with an SCSI target framework through a LUN mapping coalescing configuration tool, a LUN mapping coalescing configuration tool may be a coalescing configuration tool according to an exemplary embodiments. A SCSI target framework may include a file system vLUN-FS according to an exemplary embodiment, a shared memory according to an exemplary embodiment, and a coalescing configuration engine according to the exemplary embodiment.

According to some embodiments, there may be further provided a testing method wherein testing method may include the following steps:
1) creating a template file for virtual LUN configuration information, wherein the template file employs an xml format and defines items for each virtual LUN configuration.
2) creating a script based on the template file and according to the parameters designated by the user, so as to create a large amount of virtual LUN configuration information, wherein the script also invokes a LUN management tool, and the LUN configuration information is fed back to the tool.
3) executing a script and checking a configuration output in the virtual LUN file system, and creating a further script to travel through a virtual LUN file system and outputs statistic information regarding a number of LUNs that may be configured and their states.
4) if the output matches with what is expected as per parameters designated by a user in step 2, then the configuration operation is accurately executed.

FIG. 17 schematically shows a block diagram of an exemplary computer system/server 1712 for implementing the embodiments of the present disclosure. Computer system/server 1712 as illustrated in FIG. 17 is only an example, without any limitation to the functions and use scope of the embodiments of the present disclosure. As illustrated in FIG. 17, computer system/server 1712 is embodied in a form of general computing device. Components of computer system/server 1712 may include, but not limited to: one or more processors or processing units 1716, system memory 1728, and bus 1718 connecting different system components (including system memory 1728 and processing unit 1716).

Bus 1718 represents one or more of several kinds of bus structures, including a memory bus or a memory controller, a peripheral bus, a graphical acceleration port, a processor, or a local area bus using any bus structure in a plurality of bus structures. For example, these architectures include, but not limited to, an Industry Standard Architecture (ISA) bus, a Micro Channel Architecture (MAC) bus, an enhanced-type ISA bus, a Video Electronics Standards Association (VESA) local area bus, and a Peripheral Component Interconnect (PCI) bus.

Computer system/server 1712 typically includes a plurality of kinds of computer system readable media. These media may be any available media accessible by computer system/server 1712, including volatile and non-volatile media, movable and immovable media.

System memory 1728 may include a computer system readable medium in a manner of a volatile memory, e.g., a memory 1730 and/or a cache 1732. Computer system/server 1712 may further include other movable/immovable, volatile/non-volatile computer system storage media. Although not shown in FIG. 17, there may provide a magnetic disk driver for reading/writing a mobile non-volatile magnetic disk (e.g., "floppy disk"), and an optical disk driver for reading/writing a mobile non-volatile optical disk (e.g., CD-ROM, DVD-ROM, or other optical medium). In these cases, each driver may be connected to bus 1718 through one or more data medium interfaces. Memory 1728 may include at least one program product, the program product having a set (e.g., at least one) of program modules configured to execute the functions of various embodiments of the present disclosure.

Program/utility tool 1740 having at least program module 1742 may be stored in for example memory 1728. Such program module 1742 includes, but not limited to: an operating system, one or more applications, other program module, and program data. Each of these examples or a certain combination thereof may include implementation of the network environment. Program module 1742 generally executes the functions and/or methods in the embodiments of executing the present disclosure.

As required, computer system/server 1712 may communicate with one or more external devices (e.g., display device 1724, memory device 1714, etc.), may also communicate with one or more devices that enables users to interact with computer system/server 1712, and/or communicate with any device (e.g., network card, modem, etc.) that enables computer system/server 1712 to communicate with one or more other computing devices. Such communication may be performed via input/output (I/O) interface 1722. Moreover, computer system/server 1712 may also communicate with one or more networks (e.g., local area network (LAN), wide area network (WAN), and/or public network, e.g., Internet) via network adaptor 1720. As shown in the figure, network adaptor 1720 communicates with other modules of computer system/server 1712 via bus 1718. It should be understood that although not shown in the drawings, other hardware and/or software modules may be used in conjunction with computer system/server 1712, including, but not limited to: microcode, device driver, redundancy processing unit, external magnetic disk drive array, RAID system, a magnetic tape driver, and a data backup storage system, etc.

In the description of the embodiments of the present disclosure, the term "comprise" and like expressions should be understood as an open inclusion, i.e., "including but not limited to." The term "based on" should be understood as "at least partially based on." The term "one embodiment" or "the embodiment" should be understood as "at least one embodiment."

It should be noted that the embodiments of the present disclosure may be implemented through hardware, software or a combination of software and hardware. The hardware portion may be implemented by a specific logic; the software portion may be stored in the memory and executed by an appropriate instruction executing system, e.g., a microprocessor or a specifically designed hardware. Those skilled in the art would appreciate that the above device and method may be implemented by using computer executable instructions and/or by being embodied in processor controlled codes, e.g., a programmable memory or a data carrier such as optical or electronic signal carrier provides such codes.

In addition, although the operations of the methods of the present disclosure have been described in a specific sequence in the drawings, this does not require or suggest these operations shall be executed according to this specific sequence, or a desired result can only be achieved by executing all of the illustrated operations. On the contrary, the execution sequence of the steps described in the flow diagram may be changed. Additionally or alternatively, some steps may be omitted, a plurality of steps may be combined into one step for execution, and/or one step may be decomposed into a plurality of steps for execution. It should also be noted that the features and functions of two or more apparatuses according to the present disclosure may be embodied in one apparatus. In turn, the features and functions of one apparatus described above may be further divided to be embodied by a plurality of apparatuses.

Although the present disclosure has been described above with reference to a plurality of specific embodiments, it should be understood that the present disclosure is not limited to the disclosed specific embodiments. The present disclosure intends to cover various modifications and equivalent arrangements included within the spirit and scope of the appended claims.

What is claimed is:

1. A method for a storage system, the storage system comprising at least one initiator, each initiator accessing a corresponding storage space in the storage system via at least one virtual logic unit number LUN, the method comprising:

executing in parallel a plurality of configuration operations, wherein each configuration operation of the plurality of configuration operations is used to configure a mapping between at least one virtual LUN and at least one initiator;

wherein executing in parallel a plurality of configuration operations comprises executing in parallel the plurality of configuration operations based on a coalesced configuration request, wherein the coalesced configuration request is generated by coalescing a plurality of configuration requests, and the plurality of configuration requests correspond to the plurality of configuration operations;

wherein executing in parallel the plurality of configuration operations based on a coalesced configuration request comprises:

receiving a message indicating that the coalesced configuration request may be used; and in response to receiving the message, retrieving the coalesced configuration request from a shared memory, and executing in parallel the plurality of configuration operations based on the coalesced configuration request;

wherein executing in parallel the plurality of configuration operations based on a coalesced configuration request comprises:

in response to retrieving the coalesced configuration request from the shared memory, performing a coalescing lock to input/output operations;

in response to the coalescing lock to the input/output operations, executing in parallel the plurality of configuration operations; and releasing the coalescing lock to the input/output operations.

2. The method according to claim 1, wherein each configuration operation comprises at least one from the group consisting of:

creating an access group, removing an access group, creating a virtual LUN, removing a virtual LUN, adding an initiator into an access group, removing an initiator from an access group, adding a virtual LUN into an access group, or removing a virtual LUN from an access group.

3. A method for a storage system, the storage system comprising at least one initiator, each initiator accessing a corresponding storage space in the storage system via at least one virtual logical unit number LUN, the method comprises:

providing a tree directory structure, wherein the tree directory structure comprises at least one initiator directory and at least one virtual LUN directory, each initiator directory corresponds to one initiator, and each virtual LUN directory corresponds to one virtual LUN; and providing at least one file system interface for configuring the tree directory structure;

wherein the at least one file system interface comprises a file system interface for executing in parallel a plurality of configuration operations, and each configuration operation being used to configure a mapping between the at least one virtual LUN and the at least one initiator.

4. The method according to claim 3, wherein the tree directory structure further comprises at least one client directory, each client directory corresponding to one client.

5. The method according to claim 4, wherein the client directory is a sub-directory of a root directory, the initiator directory is a sub-directory of the client directory, and the virtual LUN directory is a sub-directory of the initiator directory.

6. The method according to claim 4, wherein the at least one file system interface comprises a file system interface for at least one from the group consisting of:

adding or removing a client under the root directory, setting or querying the type or ID of an initiator or a target port ID under an initiator directory, adding or removing a virtual LUN under an initiator directory, setting or querying the type and size of a virtual LUN under a virtual LUN directory, querying a state of a virtual LUN under a virtual LUN directory, or setting or querying a thin provision attribute and redundant attribute of a virtual LUN under a virtual LUN directory.

7. The method according to claim 6, wherein the state of the virtual LUN comprises at least one from the group consisting of: an operation state, a pause state, and an error state.

* * * * *